United States Patent [19]

Byers

[11] Patent Number: 5,019,253

[45] Date of Patent: May 28, 1991

[54] APPARATUS FOR COLLECTING AND DISCHARGING WASTE MATERIAL

[75] Inventor: Edward V. Byers, Kinoulton, England

[73] Assignee: Micharel Richard Byers, Fareham, England

[21] Appl. No.: 910,524

[22] PCT Filed: Jan. 23, 1986

[86] PCT No.: PCT/GB86/00043

§ 371 Date: Nov. 20, 1988

§ 102(e) Date: Nov. 20, 1988

[87] PCT Pub. No.: WO86/04268

PCT Pub. Date: Jul. 31, 1986

[51] Int. Cl.[5] .......................... C02F 1/40; E02B 15/04

[52] U.S. Cl. .................................... 210/158; 210/161; 210/408; 210/923

[58] Field of Search ..................... 210/158, 242.3, 402, 210/408, 525, 526, 923, 161, 396, 159, 162, 413, 415; 405/60, 74

[56] References Cited

U.S. PATENT DOCUMENTS

| | | | |
|---|---|---|---|
| 2,446,772 | 8/1948 | Laughlin | 210/396 |
| 3,464,558 | 9/1969 | Harvanek et al. | 210/159 |
| 4,119,277 | 10/1978 | Snyder et al. | 241/167 |
| 4,336,137 | 6/1982 | Byers | 210/242.3 |
| 4,353,797 | 10/1982 | Verbandt | 210/159 |
| 4,521,305 | 6/1985 | Deal | 210/158 |

FOREIGN PATENT DOCUMENTS

| | | | |
|---|---|---|---|
| 1086283 | 3/1980 | Canada . | |
| 2254371 | 7/1975 | France . | |
| 2329939 | 5/1977 | France . | |
| 54-18150 | 2/1979 | Japan | 210/162 |
| 2061752 | 5/1981 | United Kingdom | 210/242.3 |

*Primary Examiner*—Richard V. Fisher
*Assistant Examiner*—Linda S. Evans
*Attorney, Agent, or Firm*—Irvin A. Lavine

[57] ABSTRACT

Apparatus for collecting and discharging waste material comprises peripheral rows of teeth arranged on rotatable cylindrical shafts. The teeth on each shaft intercalate so that an entrapment zone for waste material is formed thereat during contra-wise rotation of the shafts. The teeth in each row pass through respective slits formed between the blade edges of rectilinear scaper blades placed between the rows and resting on the shaft. The scraper blades remove waste material from and between the teeth for discharge from the machine. To prevent the waste material being caught by cutting action between the leading faces of the teeth passing the scraper blades edges the magnitude of the angle formed at any time between those leading faces and the blades edges as the teeth pass through slits, has a value determined by the shape of the leading faces of the teeth and blade edges of the scraper blades so that the inducement of frictional engagement in relation to the materials being handled is never sufficient for a biting or cutting action to ensue.

10 Claims, 2 Drawing Sheets

APPARATUS FOR COLLECTING AND DISCHARGING WASTE MATERIAL

FIELD OF THE INVENTION

The invention relates to apparatus for collecting and discharging agglomerations of miscellaneous matter, for example as is to be found in the form of municipal rubbish and floating detritus on a water surface. Such matter may include cans and bottles, articles of wood, or cardboard or plastics material, ropes and cordage, weeds, textile waste, rotting substances such as household refuse and dead fish and birds and, also, viscous liquids such as bunker oils and tars.

BACKGROUND OF THE INVENTION

Apparatus for collecting and discharging waste material is known utilizing two cooperating sets of moving toothed structures, each being provided with plate-like teeth lying in parllel planes parallel to the direction of motion, and spaced, on each structure, at intervals perpendicular to those planes. The teeth of both structures are mutually intercalated in a collection zone where they are both moving in the same direction and, at positions remote from the collection zone, both structures interact with stationary combs comprising sets of blades which lie between adjacent lines of teeth, closely fitting against the sides of the teeth and their separating means to remove matter trapped between the teeth or adhering to the sides thereof. Means are also provided whereby the toothed structures, together with their comb assemblies, may become separated to permit the passage of matter which is too tough or bulky to be shredded by the teeth.

Both toothed structures may take the form of rotatably mounted shafts carrying assemblies of thin metal disc with circumferentially formed teeth, the discs being separated by relatively thick plain discs of diameter somewhat less than that at the tooth roots, all members being clamped together so that the assembly rotates as an integral unit.

Alternatively, one of the structure may be a shaft assembly as described and the other a belt type conveyor bearing lines of teeth at intervals across its width.

The foregoing structures are shown in Byers U.S. Pat. No. 4,336,137 and United Kingdom Patent No. 2,061,752 to the present inventor.

Although teeth of almost any conceivable shape may be used to create an entrapment and collecting action, difficulties arise with the prior art apparatus, e.g. as disclosed in the above mentioned patents, as the spoil enters the separating scraper zone because of the generation of a biting action on the material developed between the disc teeth and separator combs as the teeth move relative to the combs. If the parts are not sufficiently robust or the driving force is inadequate, this biting action will defeat the objective of the separator combs and result in either the machine breaking or jamming even when dealing with soft materials such as cordage or plastic bags.

SUMMARY OF THE INVENTION

It is one object of the invention to provide apparatus of the above type although not necessarily incorporating the two intercalated sets of toothed structures, wherein the cooperating teeth of the discs and separator combs are designed such that there is obviated the possibility of matter becoming trapped and jamming the machine by the cutting action between the teeth and combs, if the matter is too robust to be sheared, as would be the case with, for instance, wire or thick metal objects The necessity, as in the prior art, for providing a machine which is very powerful and furnished with hardened and ground teeth and combs is thereby eliminated.

According to the invention there is provided apparatus for collecting and discharging waste material comprising at least one rotatable shaft, a series of peripheral rows of teeth arranged on the or each shaft, the teeth in each row having side flanks delimiting a leading tooth face which is presented to the material to be collected by the teeth as the shaft rotates, material-clearing elements between the teeth in said rows, the elements having material-clearing blade edges defining a series of slits respectively between which a said one of the peripheral rows of teeth passes with the flanks thereof in closely spaced adjacent relationship to the blade edges such that the material collected between the rows of teeth is removed for passage to a discharge zone, said elements and said teeth being configured such that the angle formed at any time between the edges of the leading tooth face of each advancing tooth and an adjacent blade edge of a respective slit through which the teeth pass is of a magnitude necessary to ensure that the cooperating teeth and material-clearing elements do not act to bite or cut into the waste material to such an extent as to prevent said material passing smoothly to said discharge zone.

With this arrangement the biting action set up between the slits and the rotating teeth is never sufficient to induce the required amount of frictional engagement in relation to the material being handled by the machine, so that the waste material being collected does not therefore become caught between the teeth and the material-gathering elements, but is passed smoothly by these elements to the discharge zone.

In a preferred form cylindrical separators are between the peripheral rows of teeth of the material-gathering elements in the form of flat scraper blades having rectilinear blade edges, which rest tangentially on the separators. The leading faces of the rotating teeth are then configured to lie on the involute of a base circle which is the generatrix of the rotating cylindrical separators. In this case the angle between the scraper blade edges and the edges of the leading faces of the rotating teeth is always 90°.

Other features and advantages of the invention will become clear from the following detailed description of preferred embodiments of the invention.

BRIEF DESCRIPTION OF THE DRAWINGS

The invention will be described by way of example with reference to the accompanying drawings wherein:

FIGS. 5a and 5b show preferred arrangements for driving the machine of FIG. 1a.

BEST MODES OF PERFORMING THE INVENTION

Figure 1B:
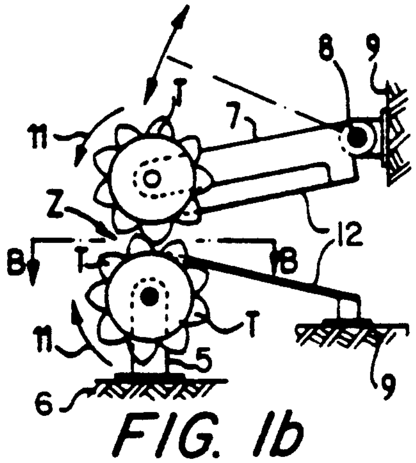
FIG. 1*b* is a sectional view of the apparatus of FIG. 1*a* taken along the line A—A.
Figure 1A:
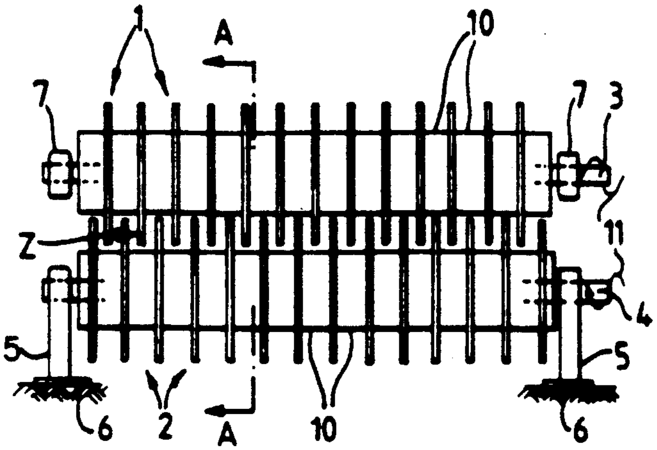
FIG. 1*a* is a front elevation of apparatus for collecting and discharging waste material as seen from the direction from which spoil is being accepted, provided with teeth bearing collector discs and waste material removing scraper blades according to one form of the invention.
Figure 1C:
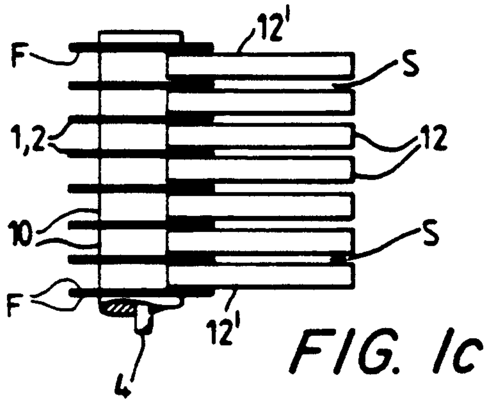
FIG. 1*c* is a view of the machine of FIG. 1*a* taken along the line B—B of FIG. 1*b*.

The apparatus for collecting and discharging waste material shown in the drawings, and more particularly in FIGS. 1a, 1b and 1c comprises upper and lower rows 1 and 2 or peripheral teeth T arranged respectively on horizontal shafts 3 and 4.

The lower shaft 4 is journalled for rotation in fixed bearings 5 mounted at fixed positions 6, while the upper shaft 3 is mounted on bearings at the free ends of lever arms 7 which swing about pivots 8 attached to a fixed location 9. Positions 6 and 9 bear a fixed relationship to one another, as for instance, would be the case when the various parts are attached to a mounting framework.

The rows 1 and 2 of teeth T are set apart in planar fashion by cylindrical spacers 10, and are mounted to have their respective rows of teeth T at least partially intercalated to form an entrapment zone Z for waste material as shown in FIG. 1b, as the shaft 3 and 4 rotate in contra-wise fashion as indicated by the arrows 11.

End portions of scraper comb plates 12 having rectilinear blade edges 12', are mounted between the rows 1 and 2 and press firmly against the spacers 10, with their blade edges 12' in close fitting relationship to the side flanks F of teeth T, the other ends being fixed by any convenient known method to the lever arms 7 for those on the upper shaft 3, and to the fixed location 9 for those on the lower shaft 4. The blade edges 12' of adjacent scraper blades 12 form slits S between which the teeth T of each respective row pass as the shafts 3 and 4 rotate.

Material thus entering the zone Z is crushed, impaled or shredded depending on its nature. Viscous substances such as tars or heavy oils become convoluted around the teeth T of the discs and adhere strongly to the sides thereof. Objects which are too tough to be dealt with as described cause the upper shaft 3 to rise and ride over them, the teeth T then exerting a gripping function to permit this to happen.

After leaving the entrapment zone Z the spoil is stripped from the teeth T by the action of the scraper comb blades 12 as the teeth T pass through the slits S, for deposition in a collection chamber (not shown) for feeding to any subsequent process.

Although not illustrated shafts 3 and 4 which need not necessarily rotate at the same speed, may be driven from a power source of any known type by a transmission system such as hydraulic motors on the shaft ends connected by pipeline to a pump and motor unit. Chain and linkwork systems may also be used.

The teeth T of the discs in rows 1 and 2 are specially designed in accordance with the invention, so that, as described earlier. There is eliminated biting action between the leading faces of the teeth T presented to the material being collected as the shafts 3 and 4 rotate and the scraper comb plate edges 12' which would cut and shear the material being gathered; thus action causing clogging or breakdown is eliminated.

This biting action will occur if the "attack" angle with respect to the material being gathered, formed at any time between the leading faces of teeth T and the edges 12' of the scraper comb blades 12 as the teeth pass through the slits S between them, is below a certain value, taking into account the roughness and sharpness of the interacting surfaces and the nature of the waste material in question.

The phenomenon is easily understood by considering the effect of scissor blades. If the blades are wide open to an angle of 90° or greater, they will not bite into a piece of paper however sharp they are.

However, as the "attack" angle between the blades gradually decreases a biting and cutting action will ensue. It has been found for example that with teeth and scraper comb blades that have smooth surfaces, the undesired biting action did not occur with angle of attack A greater than 70°.

Figure 2:
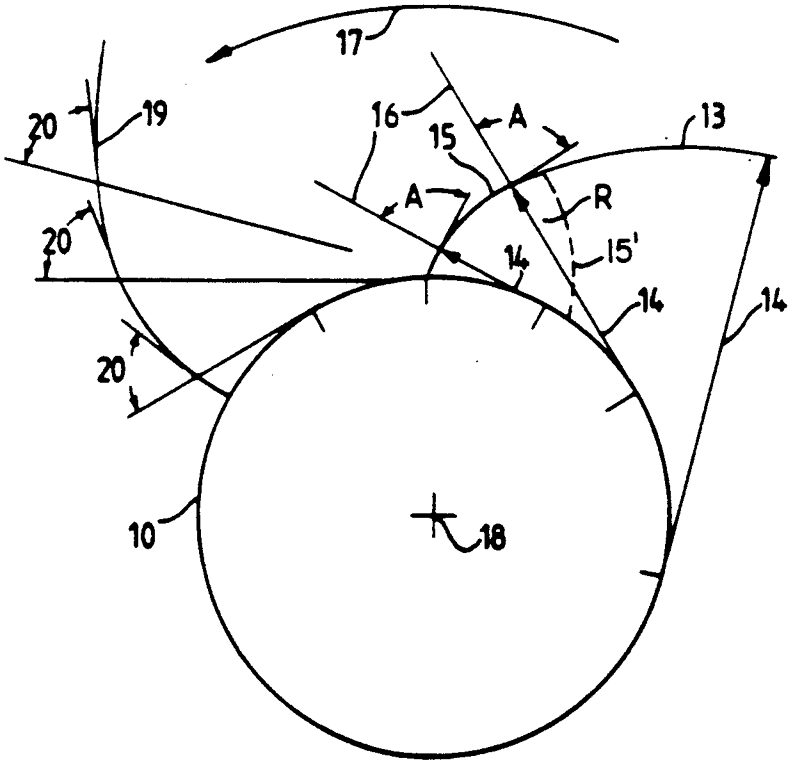
FIG. 2 illustrates one way of determining the curvature of the leading face of the teeth of the collector discs interacting with a scraper comb blade of rectilinear form.

The attack angle is of the required magnitude in the embodiment of the invention illustrated when the leading face of each tooth T lies on the involute 13 of the circle 14, whose diameter is that of the cylindrical spacers 10 as shown in FIG. 2.

The heavily lined portion 15 of the involute curve 13 in FIG. 2 is the leading face of a representative tooth R, while the dotted portion 15' is the trailing face of tooth R. The attack angle at any time may be defined by the angle A formed between tangents on the curve 13 at the points of intersection of tangents 1B to the circle 14 with the curve 13, the latter tangents being extensions of the scraper comb blades 12 (not shown in FIG. 2) lying on the spacers 10, if it be imagined for purposes of illustration that the circle 14 rotates with respect to the curve 13.

Since the curve 13 is the involute of the circle 14, the angle of attack A in FIG. 2, between the leading face of the tooth R and a fixed scraper blade, is always 90° as the tooth R rotates in practice, in the direction of the arrow 17 about the center 18.

If either of the shafts 3 and 4 are always rotated in one direction the shape of the trailing face 15' is not important, and may take the form of a straight line descending from the tooth crest to the root of the adjacent tooth.

However, it will sometimes be desirable to regurgitate or disgorge the collected spoil by reversing the rotation of the shafts 3 and 4, an oppositely facing set of scraper blades at some other point on the circumference being used to disgorge the spoil. In such a case, the tooth face 15' should then be the reverse of the original shape leading face 15 as shown.

The necessary shape of the flanks of teeth T having a constant, but different attack angle, may be found with the assistance of the formula:

$$L = R \times \tan A \times (e\theta/\tan A - 1)$$

Where

L = Length of tangent to generating circle.

$\theta$ = Angular distance of tangent point from the start point of the curve.

R = Radius of base circle

A = Attack angle.

Curve 19 shown in FIG. 2, is calculated from this formula with an attack angle 20 of 70°. This smaller attack angle is sometimes of advantage in that, for a given desired tooth height, the tooth is narrower and more may be used around the circumference. A composite curve having an attack angle which varies with the tooth height, but is nowhere less than the minimum requirement may also sometimes be of value. It is, in practice, usually possible to approximate the mathematically correct curve with a portion of a plain circular arc, which is easier to manufacture.

Figure 3:
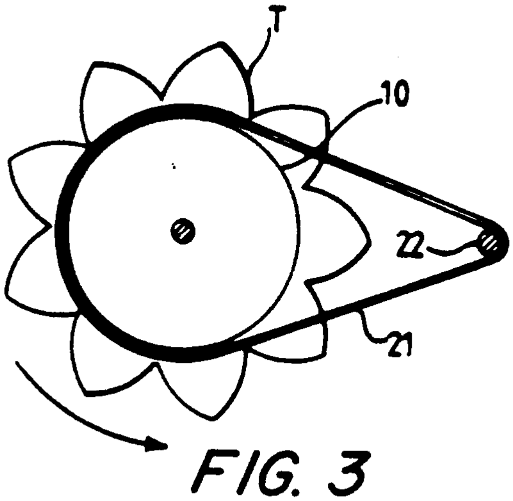
FIG. 3 shows a preferred constuction of a scrapper comb.

FIG. 3 shows a modified form of scraper comb blade in the form of a continous metal band 21 which loosely engages the circumference of the separators 10 and also a stationary reaction rod 22 which spans the entire machine longitudinally of the shafts 3 and 4.

To form the band 21, the ends of a metal strip may be welded together or any known convenient type of end joint may be used at some indifferent position, such as, for instance, a bolt and nut in rear of the rod 22.

Figure 4:
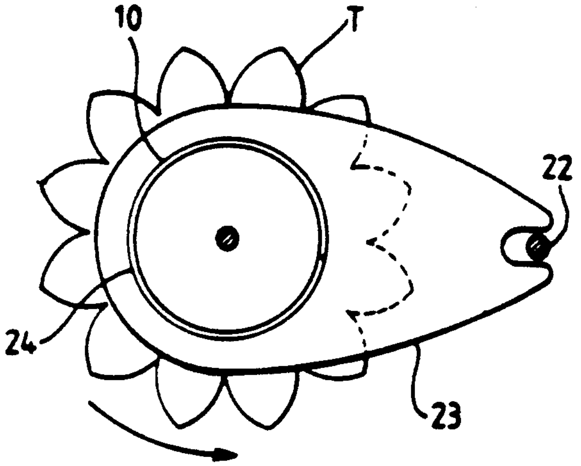
FIG. 4 shows a further form of scraper comb.

FIG. 4 shows a further modified form of scraper comb blade 23, which may be molded of a plastics material such as nylon. It is provided with an open-ended slot to engage the reaction rod 22, as before. The blade 23 is provided with a circular opening 24 accommodating the separators 10 which are of smaller diameter. Due to the curvature of the sides of the scraper blade 23 the attack angle A is increased and this will sometimes be useful when it is desirable to use disc teeth which otherwise would have a smaller attack angle with respect to a straight scraper blade of the type shown in FIG. 1.

Both the types shown in FIGS. 3 and 4 may be used for regurgitating machines in which disgorgement occurs on reversal of rotations of the shafts 3 and 4.

FIG. 5 shows a method of driving the machine for collecting and discharging waste material so as to obtain the necessary contrariwise rotation of the upper and lower shafts 3 and 4 and the rise and fall motion of the upper assembly. This is achieved by means of a single drive chain which engages sprockets at both sides of the chain as will be described.

Figure 5A:
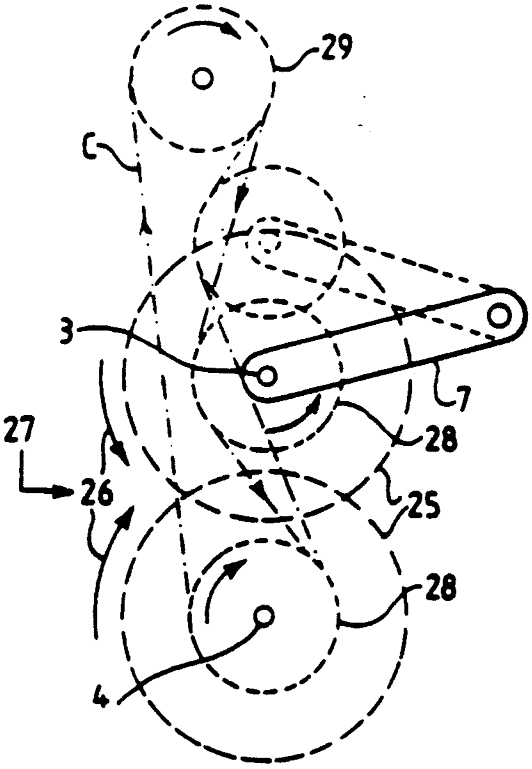
Figure 5B:
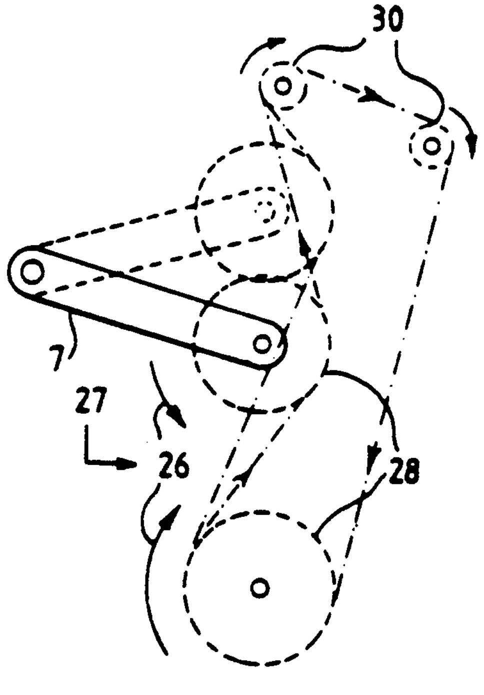

In FIG. 5*a* the dashed lines 25 are representations of upper and lower toothed disc assemblies being driven in the directions of arrows 26 to accept spoil arriving in the direction of arrow 27, the shafts of the assemblies being attached to driven chain sprockets 28.

FIG. 5*a* shows two identical sprockets 28 and a sprocket 29 which is in a fixed position and powered to rotate in the direction shown. A single endless chain C is routed as shown so as to provide the required rotation. The lever arm 7 carrying the upper shaft disc assembly 3 is shown in the extreme up and down positions which occur during the rise and fall motion. Although strict mathematical accuracy is not obtainable, it is possible to select a length of lever arm 7 and the position of the pivot thereof in relation to the size and extreme positions of the upper shaft sprocket 28, the total length of the chain C in the system will remain constant from a practical point of view, and thereby the need for a heavily biassed jockey sprocket to take up any slack is avoided.

In a case when the two driven sprockets 28 are of differing size to provide differing shaft speeds and/or when it is desirable to take advantage of the ability of a chain-drive system to provide a speed reduction ratio relative to the driving sprocket it will not always be possible to use the simple system of FIG. 5*a* so that the oppositely moving parts of the chain remain clear of each other. This difficulty may be overcome by adopting the more complicated arrangement of FIG. 5*b*. In this diagram the two main driven sprockets 28 are of different sizes. Two smaller sprockets 30 are shown in fixed positions, power being delivered to either one of them, the other then acting as an idler to permit the necessary chain clearances to be obtained. The chain is routed as shown, but in this case the center of the lever arm 7 must be pivoted forward of the shaft assembly instead of to the rear. The advantage of sensibly invariant chain length may be realized as before.

Although a preferred embodiment of the invention has been described with reference to a machine incorporating two sets of intercalating toothed structures, it is equally applicable to a machine employing a single set, and this is reflected in the appended claims.

Moreover additions and modifications to the disclosed embodiment will be apparent to one skilled in the art but such will be within the scope of the claims which follow. For example to achieve the results of the invention, it is not essential that the scraper comb blades be rectilinear and the co-operating leading faces of the rotating teeth be curved, so long as the required angular relationship between them is preserved.

Thus the leading faces of the teeth (or face edges thereof) may be rectilinear and the scraper blade edges curved, or alternatively the leading faces (or face edges thereof) and blade edges may be of curved profile as appropriate.

I claim:

1. Apparatus for collecting and discharging solid and viscous liquid waste material comprising:

at least one rotatable shaft;

a plurality of support means for said at least one shaft, means for mounting said support means in spaced relationship for swinging movement with said at least one shaft, a plurality of teeth on each said shaft, each said tooth having side flanks and a leading tooth edge which is presented to the material to be collected by said teeth as said at least one shaft rotates;

a plurality of material-clearing elements mounted between said support means, said elements having material-clearing blade edges defining a series of slits respectively between which said teeth on said shaft pass with said side flanks in closely spaced adjacent relationship to said blade edges for removal of material collected from said teeth; and wherein the angular relationship between the blade edges of said elements and the leading edges of said teeth is such that the angle formed at any time between the leading edge of each advancing tooth and the adjacent blade edge of a respective one of said slits through which said teeth on each said support means pass is of a magnitude sufficient to ensure that said teeth and said elements do not bite or cut into said solid and viscous liquid waste material to an extent which would prevent said waste material passing smoothly from said teeth.

2. Apparatus for collecting and discharging solid and viscous liquid waste material comprising:

at least one rotatable shaft;

means for rotating said at least one shaft about the axis or axes thereof;

means for supporting said at least one shaft, means for mounting said support means for swinging movement with said at least one shaft, a plurality of teeth on each said shaft, each said tooth having side flanks and a leading tooth edge which is presented to the material to be collected by said teeth as said at least one shaft rotates;

a plurality of spaced material-clearing elements mounted between said support means for removal of material collected between said teeth, said elements having material-clearing blade edges defining a series of slits respectively between which said teeth on a said shaft pass with said side flanks in closely spaced adjacent relationship to said blade edges; and means for preventing the biting or cutting into of said solid and viscous liquid waste material to an extent which would prevent discharge of the waste material from said teeth by relative movement of said teeth past and in adjacent relationship to the blade edges of said material-clearing elements comprising the configuration of the leading edge of each said tooth and of the adjacent blade edge to form a suitably large angle with said adjacent blade edge.

3. Apparatus as set forth in claim 2, wherein each said tooth is spaced from the adjacent tooth or teeth along said shaft by a cylindrical spacer and said teeth are mounted for rotation with said at least one rotatable shaft, said material-clearing elements being in the form of flat blades having upper and lower rectilinear surfaces with a lower surface portion thereof lying tangentially on a respective one of said spacers, said leading tooth edges of each of said teeth having a predetermined curvature.

4. Apparatus as set forth in claim 3, wherein each of said flat blades is a portion of a stationary metal band extending partly around a said cylindrical spacer.

5. Apparatus as set forth in claim 3, wherein said predetermined curvature lies on the involute of a base circle being the generatrix of said cylindrical spacers.

6. Apparatus as set forth in claim 5, wherein the trailing face of each of said teeth is the same as that of said leading face thereof but of opposite hand, whereby to permit the material collected to be disgorged upon reversal of rotation of the or each shaft.

7. Apparatus as set forth in claim 5, wherein said predetermined curvature is substantially the arc of a circle.

8. Apparatus as set forth in claim 7, wherein the trailing face of each of said teeth is the same as that of said leading face thereof but of opposite hand, whereby to permit the material collected to be disgorged upon, reversal of rotation of the or each shaft.

9. Apparatus as set forth in claim 2, and further comprising a second rotatable shaft including teeth thereon, the teeth on one shaft intercalating with the teeth on the other shaft to form an entrapment zone for waste material as said two shafts are rotated in opposite directions.

10. Apparatus for collecting and discharging solid and viscous liquid waste material comprising:

at least one rotatable shaft;

means for rotating said at least one shaft about the axis or axes thereof;

means for supporting said at least one shaft, means for mounting said support means for swinging movement with said at least one shaft, a plurality of teeth on each said shaft, each said tooth having side flanks and a leading tooth edge which is presented to the material to be collected by said teeth as said at least one shaft rotates;

a plurality of spaced material-clearing elements mounted between said support means for removal of material collected between said teeth, said elements having material-clearing blade edges defining a series of slits respectively between which said teeth on a said shaft pass with said side flanks in closely spaced adjacent relationship to said blade edges; and means for preventing the biting or cutting into of said solid and viscous liquid waste material to an extent which would prevent discharge of waste material from said teeth by relative movement of said teeth past and in adjacent relationship to the blade edges of said material-clearing elements comprising the leading edge of each said tooth and the adjacent blade edge forming an angle between them in all positions in which a said tooth leading edge and a said blade edge are juxtaposed, which angle is of a magnitude sufficient to apply a force to material by said tooth without substantial cutting of such material by said tooth and element.

* * * * *